United States Patent [19]

Shannon et al.

[11] Patent Number: 5,407,062
[45] Date of Patent: Apr. 18, 1995

[54] CONTACT LENS MOLD PACKAGING

[75] Inventors: John H. Shannon, Hamlin; Joan L. Pierce, Honeoye Falls, both of N.Y.

[73] Assignee: Bausdh & Lomb Incorporated, Rochester, N.Y.

[21] Appl. No.: 189,397

[22] Filed: Jan. 28, 1994

[51] Int. Cl.6 .............................. B65D 81/22
[52] U.S. Cl. ................... 206/5.1; 134/137; 134/901
[58] Field of Search ............ 206/5.1; 134/901, 137

[56] References Cited

U.S. PATENT DOCUMENTS

| | | | |
|---|---|---|---|
| 2,940,589 | 6/1960 | Silverman | 206/5.1 X |
| 3,524,455 | 8/1970 | Hoogesteger et al. | 206/5.1 X |
| 4,121,896 | 10/1978 | Shepherd . | |
| 4,197,266 | 4/1980 | Clark et al. . | |
| 4,208,364 | 6/1980 | Shepherd . | |
| 4,390,482 | 6/1983 | Feurer . | |
| 4,392,569 | 7/1983 | Shoup | 206/5.1 |
| 4,415,076 | 11/1983 | Campbell | 206/5.1 |
| 4,469,646 | 9/1984 | Rawlings . | |
| 4,565,348 | 1/1986 | Larsen . | |
| 4,782,946 | 11/1988 | Pollak . | |
| 4,865,779 | 9/1989 | Ihn et al. . | |
| 5,016,749 | 5/1991 | Kaye et al. | 206/5.1 |
| 5,036,971 | 8/1991 | Seden et al. . | |
| 5,143,660 | 9/1992 | Hamilton et al. . | |
| 5,271,875 | 12/1993 | Appleton et al. . | |

FOREIGN PATENT DOCUMENTS

| | | | |
|---|---|---|---|
| 0062951 | 11/1972 | Australia | 206/5.1 |
| 2038283 | 3/1991 | Canada . | |

*Primary Examiner*—Bryon P. Gehman
*Attorney, Agent, or Firm*—David M. Krasnow; Salvatore P. Pace

[57] ABSTRACT

A contact lens package made from one of the mold parts used to mold a contact lens, the lens being packaged in a storage cavity separate from a molding surface of the mold part.

7 Claims, 3 Drawing Sheets

CONTACT LENS MOLD PACKAGING

FIELD OF THE INVENTION

The present invention pertains to the field of contact lens packaging means and the use of molding apparatus as the final packaging means.

BACKGROUND OF THE INVENTION

Cast molding is a known method for producing contact lenses. Generally, monomer mix is introduced into two mold parts which form the mold assembly. The monomer mix is then cured in the mold assembly to form a contact lens. The monomer mix is generally placed in an anterior, or female mold. The anterior mold has a concave surface that is used to shape the anterior surface of a lens. A posterior, or male mold is then brought into contact with the anterior mold so that the monomer mix is located in the cavity formed between the two molds. The posterior mold has a convex surface used to shape the posterior surface of the lens. The monomer mix is cured within the mold to form a contact lens. The anterior and posterior lens molds are then separated, and the cured lens is removed and placed into a package able to withstand the requirements for storage and shipping. The lens is usually packaged and shipped in the hydrated state so that, in addition to the lens, the package usually contains a storage solution.

Molds are typically discarded after the lens has been removed. While some of the mold materials may be recyclable, significant waste occurs and cost is added to the overall lens manufacturing process.

Recently, there has been interest in using molds, after the molding process is completed, as the lens package in which the finished lens is shipped and stored. U.S. Pat. No. 5,036,971 discloses the use of the anterior or female mold, as a packaging means for the molded lens. U.S. Pat. No. 5,143,660 discloses the use of the posterior or male mold as a packaging means for the molded lens. In both of these U.S. patents, the molding surface forms a part of the lens storage cavity. An advantage of these prior art approaches is that the lens can remain on the same surface from the time it is formed until it is removed from the package by the end user.

However, a problem with the approach disclosed in the patents is that the dimensions of such molding cavities may not be suitable for use as a storage chamber or final lens package for the lens. The cavity or chamber may have walls which are too steep to facilitate lens removal by the practitioner or patient. Further, the cavity in which the contact lens is molded and retained may have insufficient volume and therefore cannot hold a desired amount of lens solution thought to be required for storage and shipping.

In addition, in the case of hydrogel lenses, the lens is often hydrated after molding, but before shipping. During hydration, the lens swells. The dimensions of the anterior and posterior molding surfaces are generally smaller than the diameter of the hydrated lens. Therefore, the lens may not fit in the mold cavity in its hydrated state.

SUMMARY OF THE INVENTION

The present invention is a contact lens package comprising a contact lens mold having a lens molding surface used for lens formation and a sealable contact lens storage cavity distinct from the lens molding surface.

More specifically, the present invention is a contact lens package comprising a mold having a concave lens molding surface, a convex surface opposite the molding surface and a substantially cylindrical wall extending from the molding surface which forms a sealable contact lens storage cavity.

In a further embodiment a contact lens package is disclosed comprising a mold having a convex lens molding surface, a concave surface opposite the molding surface and a substantially cylindrical wall extending from the molding surface which forms a sealable contact lens storage cavity.

DETAILED DESCRIPTION OF THE INVENTION

Preferred molds for use as the contact lens packages of this invention are of the kind described in U.S. Pat. No. 5,271,875. More specifically, preferred anterior molds have a concave lens molding surface, a convex surface opposite the molding surface and a substantially cylindrical wall extending from the molding surface so as to form a sealable lens storage cavity with the convex surface.

Preferred posterior molds have a convex lens molding surface, a concave surface opposite the molding surface which forms a sealable lens storage cavity. Particularly preferred posterior molds have a hollow substantially cylindrical base. Preferred embodiments will now be described with reference to the Figures.

Figure 1:
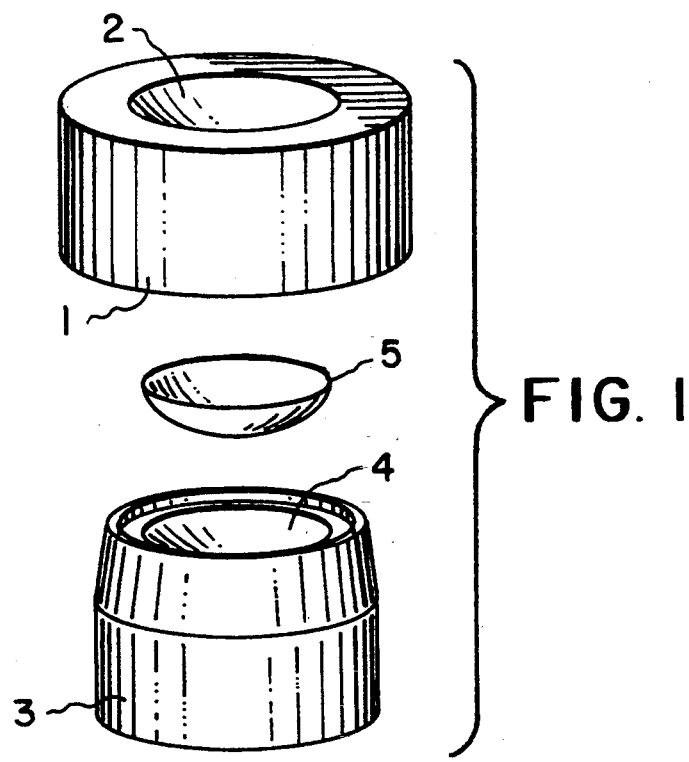
FIG. 1 is a perspective view of the overall configuration of an anterior and posterior mold with a cured contact lens.

FIG. 1 shows an exploded view of a lens mold assembly after curing. The posterior mold 1 has a posterior contact lens storage cavity 2 visible on the top of the posterior mold and a posterior lens molding surface which is not visible. The anterior mold 3 has an anterior lens molding surface 4, and an anterior contact lens storage cavity which is not visible. The anterior and posterior lens molding surface, when brought together form the lens molding cavity in which the contact lens is molded. When the monomer mix is injected onto the lens molding surfaces and cured into a lens, the mold parts are removed and the cured contact lens 5 is released from the lens molding surfaces.

Figure 2:
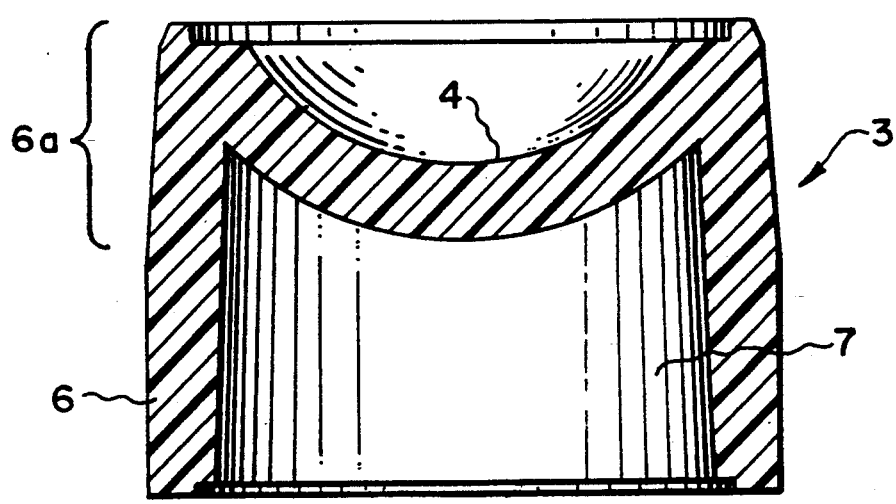
FIG. 2 is a cross-sectional view of an anterior lens mold.

As shown in FIG. 2, in a preferred embodiment, an anterior mold 3 includes a substantially cylindrical wall 6 which blends into a tapered head portion 6a. The tapered head portion 6a serves as a centering means to center the anterior mold within a complimentarily shaped taper in the posterior mold. The anterior mold also includes a concave anterior lens molding surface 4 formed to provide the desired anterior surface to the cured lens. If the anterior mold is to be used as a package for the finished lens, the lens is placed in the lens storage cavity 7. Because of its concavity, during the lens molding procedure, the curable monomer mix will be placed onto the anterior lens molding surface 4.

Figure 3:
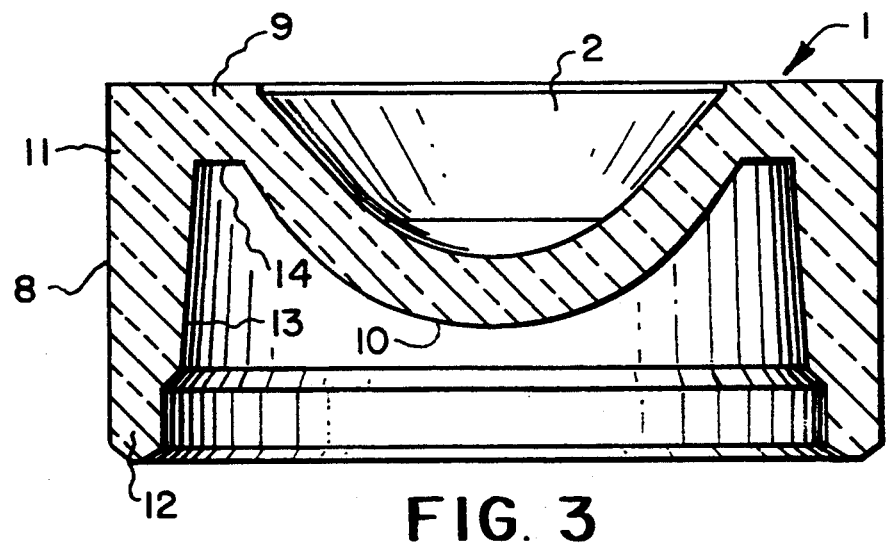
FIG. 3 is a cross-sectional view of a posterior lens mold.

As shown in FIG. 3, the posterior mold 1 includes a substantially cylindrical wall 8 dimensioned to allow the anterior mold 3 to fit the posterior mold 1 complementarily as discussed above. An annular flat surface 9 is shown. The posterior mold 1 includes a posterior lens molding surface 10, the opposite side of which defines the bottom surface of the lens storage cavity 2. The annular flat surface 9 may optionally have a raised rim (not shown) which could interlock with, or otherwise facilitate attachment of a sealing cover (not shown) to the top flat portion as would be apparent to one skilled in the packaging field, thereby sealing the posterior storage cavity 2.

The thicknesses of the posterior and anterior molds are selected to be sufficient so that the mold cavity defining surface is rigid and does not deform under curing or polymerizing stress unless such material deformation is specifically desired or critical to proper lens formation. In a preferred embodiment, the substantially cylindrical wall 8 of the posterior mold 1 is joined to an annular flat portion 9 at shoulder 11. The posterior mold 1 further includes a portion of the base 12 which is relatively thinner than the remainder of the mold to provide an internal diameter that is larger at the base than that defined by the remainder of the mold, thereby facilitating access for anterior mold 3. Base portion 12 includes optionally includes a stepped diameter which leads into taper 13. Taper 13 provides an automatic centering means for the alignment and centering of anterior mold 3 with respect to posterior mold 1. It is understood that the present invention contemplates the use of any two molds each having a complementary molding surface which may be brought into close association for the purpose of creating a molding cavity in which a contact lens is molded.

Taper 13 reverses at 14 and leads to posterior lens molding surface 10 having a generally spherical surface. "Generally spherical" is understood to include shapes which are not strictly spherical such as aspheric or toric shapes.

As shown in FIG. 2, anterior mold 3 includes a substantially cylindrical wall 6, tapered head 6a and "generally spherical" (as defined above) anterior lens molding surface 4. The diameter of taper in the anterior mold 3 is selected so that it is slightly smaller than the corresponding diameter of taper in the posterior mold 1. This ensures that the mold sections seat correctly while also ensuring that they are properly centered. Preferably the molds seat with a 0 to 20 micron clearance between tapers 6 and 13; more preferably with a 0-10 micron clearance.

Figure 4:
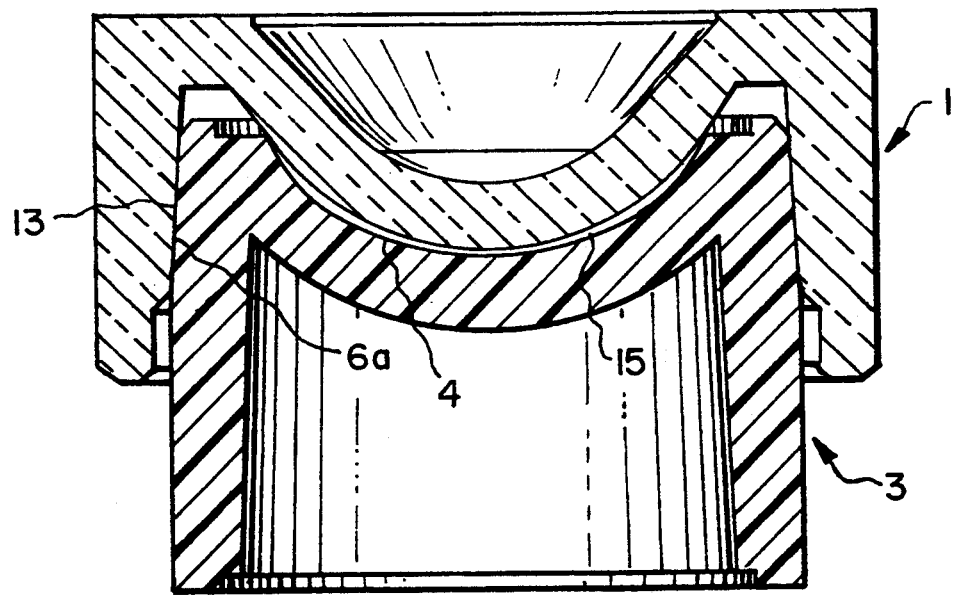
FIG. 4 is a cross-sectional view of the lens mold assembly.

FIG. 4 cross-sectionally illustrates posterior mold 1 and anterior mold 3 in their assembled form. Posterior mold 1 seats in close association against anterior mold 3. Tapers 13 and 6a meet with the above-noted clearance so as to center the anterior and posterior molds thereby preventing prism or other undesired defects caused by decentering. As so assembled, the two mold sections form a predefined mold cavity 15 in which curable contact lens monomer mix formulations such as polymerizable 2-hydroxyethyl methacrylate (HEMA) may be held during curing. While such an embodiment is not depicted, it is understood that the present invention encompasses intentional decentration of the two mold parts for the purpose of inducing desired prism in the molded lens. It is further understood that the invention would be useful for contact the manufacture and storage of any type of lenses, and would be particularly useful for the manufacture and shipping of soft hydrophilic contact lenses including hydrogels which presently are shipped in the hydrated state. Hydrogels are hydrophilic polymers that absorb water to an equilibrium value and are insoluble in water due to the presence of a three-dimensional network. Hydrogels are generally formed of a copolymer of at least one hydrophilic monomer and a crosslinking monomer. The hydrophilicity is due to the presence of hydrophilic groups, such as alcohols, carboxylic acids, amides and sulfonic acids. The swollen equilibrated state results from a balance between the osmotic driving forces that cause the water to enter the hydrophilic polymer and the forces exerted by the polymer chains in resisting expansion. In the case of silicone hydrogel contact lenses, the copolymeric material further includes a silicone-containing monomer.

Generally, the two mold parts, anterior and posterior, are substantially cylindrical with varying overall diameters such that the convex lens forming surface of the posterior mold comes into intimate contact or close association with the concave anterior mold lens forming surface. Intimate contact and close association are defined as being as close as the desired thickness of the contact lens being produced between the two cooperating mold parts.

The substantially cylindrical walls of the posterior and anterior molds are sufficiently thick to withstand the whatever pressure which may be supplied to the mold assembly during the lens molding process. The lens mold assembly is understood to represent the anterior and posterior molds in close association with one another. In the preferred embodiment, if predetermined material deformation is required of the mold, the posterior mold is made from a material flexible enough to deform as needed, while also retaining its shape so that it may be used as a sealable contact lens package. The height of the substantially cylindrical walls is not critically important. However, in the preferred embodiment, the height of the cylindrical walls of the posterior mold is less than the height of the anterior mold to facilitate mold separation and lens release.

As already described, preferred posterior molds have a convex lens molding surface and a concave surface opposite the molding surface which forms the lens storage cavity. Particularly preferred posterior molds have substantially cylindrical walls. The posterior and anterior lens storage cavities are preferably concave and convex respectively, at the bottom, but may be any desired shape or texture at the bottom. The storage cavity preferably has a diameter and volume capacity large enough to store a contact lens and lens storage solution. The bottom or side walls of the storage cavity may have features designed to assist in restricting the movement of the contact lens. The storage cavity may also have features to facilitate lens removal such as a particular slope or textured finish.

The annular flat surface at the top perimeter of the storage cavity may itself have a rim or raised area to facilitate securing a sealing means to cover the contact lens storage cavity. The sealing means may be affixed to the rim via heat or chemical reaction or through any covering and sealing means as would be readily apparent to one skilled in the container field.

The present invention contemplates using the molds and packages of the present invention in connection with the production of all types of contact lenses. Therefore any lens-forming material can be employed in the present invention. The materials may be hydrophilic, or hydrophobic, or mixtures of both. The resulting contact lenses may be hard lenses as exemplified by the rigid acrylic plastics including poly(methyl methacrylate); or such contact lenses may be flexible, hydrophobic lenses exemplified by the unsubstituted and fluoro-substituted polyethylenes, the silicone elastomers, and the like; or such lenses may be soft hydrogel lenses as already described.

It is understood that materials for posterior and anterior molds may be selected in consideration of their physical properties such as their affinity for cured lens materials. Such affinity is useful if it is desired that the lenses are preferentially retained by either the anterior or posterior mold half upon their separation from one another during lens processing. It has been found that a combination of polypropylene (e.g. MARLEX ® from Phillips 66) for posterior mold 1 and rigid unplasticized polyvinyl chloride (e.g. GEON ® from B. F. Goodrich) for anterior mold 3 provides a suitable combination of materials. Other materials would be readily apparent to the skilled practitioner and the same materials may be used for both anterior and posterior molds.

After the curing takes place, the molds are separated. The cured contact lens preferably clings in a predetermined way to either the posterior or anterior lens molding surface. The lens is then removed from the molding surface, to which it was preferentially bound, by directly removing the lens from the mold surface. The lens may also be removed from the mold by allowing the lens to free itself from the mold, for example into an hydration tank, after it has been hydrated.

Figure 5:
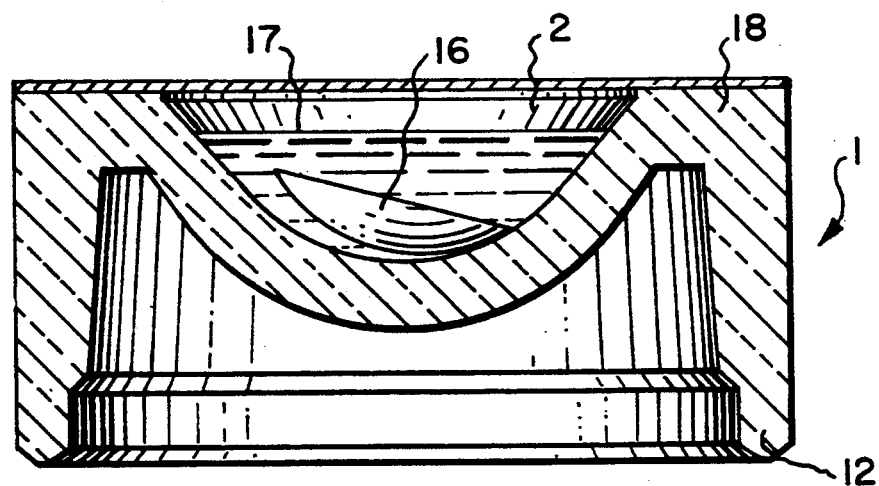
FIG. 5 is a cross-sectional view of a posterior mold package containing a contact lens in a solution in the sealed storage cavity.
Figure 6:
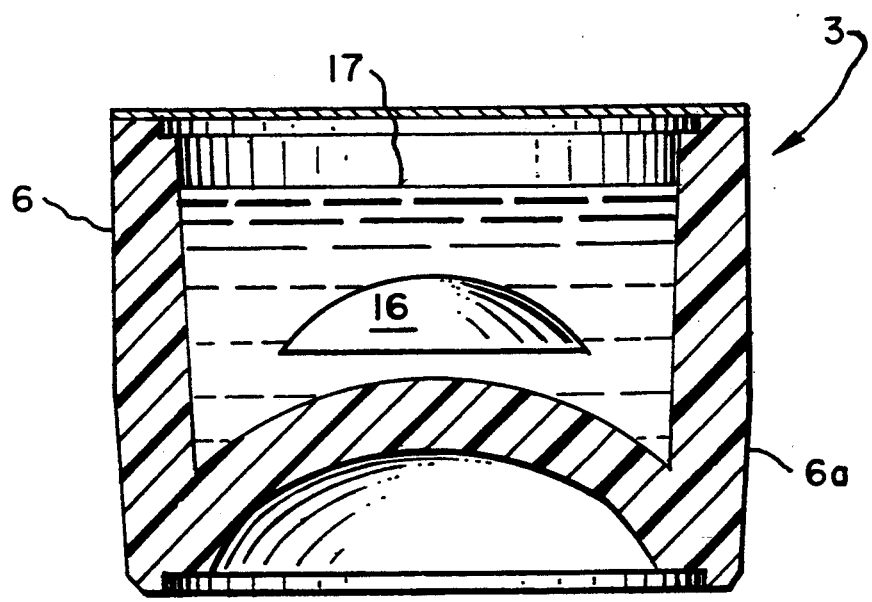
FIG. 6 is a cross-sectional view of an anterior mold package containing a contact lens in a solution in the sealed storage cavity.

As shown in FIG. 5, the lens 16 is then placed in the storage cavity 2 portion of the posterior lens mold 1. The storage cavity 2 is preferably filled with a selected volume of lens solution 17. A cover 18 which is designed to remain in close association with the top of the lens mold 1 may then be sealed to the top of the mold to seal the storage cavity 2 through heat treatment, or via other sealing means as are known and would be readily apparent to one skilled in the field.

A secondary package or tray into which a number of lens packages, such as those shown in FIG. 5 is further contemplated by the present invention. In one preferred embodiment, the base portion 12 of the lens package, which is preferably circular, fits into circular depressions present in the secondary package or tray. The use of a secondary package is thought to facilitate packaging and shipping.

It is understood that the storage cavity on the molds of the present invention could just as effectively be incorporated into the anterior or female mold. In this way the lens would be sealed in a storage cavity in the anterior mold, unrelated to and distinct from the anterior lens molding surface. The lens package could then be shipped individually, or integrated into a secondary shipping package.

As mentioned previously, the molds of the present invention are preferably injection molded or thermoformed from any suitable thermoplastic materials such as polyolefins (e.g. polyethylenes, polypropylenes, polybutenes), polyamides, polyesters, polysulfones or other plastics and plastic resin materials which are known by those skilled in the field to perform well as contact lens mold and contact lens packaging materials, with polypropylene being particularly preferred. The materials selected must also perform well regarding impermeability such that the lens solution is retained within the package for at least the shelf life duration of the lens and solution, and preferably for from three to five years. The selected material must also be able to withstand conditions used to sterilize the contents as required in the industry such as heat and various radiation procedures. The preferred material selected should also be impervious to bacteria and pathogens such that the sterility of the packaged lenses and accompanying solution is assured.

The configuration illustrated in FIG. 4 of the cooperating molds is a preferred embodiment for positioning the mold surfaces. However, it will be apparent to those skilled in the field that other cooperating surface configurations provided on each of the mold members would be acceptable for the same purpose so long as the required spacing and alignment restrictions are achieved. For example, FIG. 2 shows the anterior mold fitting inside of the posterior mold which houses the storage cavity. It is understood that the present invention clearly contemplates a posterior mold which may fit inside of the anterior mold.

The material to be used as a cover for the cavity may be made of a single layer, or is preferably a laminate of materials such as plastic (e.g. polypropylene) films and metal (e.g. aluminum) foils. Such a cover can be sealed to the top of the cavity of the package by means known in the packaging field, and may be preferably heat sealed. The cover should be sealed such that the sterility of the lens and solution contained in the sealed package is preserved until the package is opened. Since the storage must not evaporate for a potentially long shelf life, the cover should be made from a material which is impermeable. It is understood that lens identification or other labelling information can be printed or imprinted on the cover.

In one embodiment of the present invention, the area around the inside or outside of the top of the posterior or anterior mold may be machined such that the area is "threaded". It is understood that the term "threaded" means that a helical or spiral ridge has been machined into a material. A plastic cover made from a selected material (e.g. polypropylene) may be threaded to match the threaded region on the mold. In this way, a hard plastic cover, for example, may be screwed into place over the previously sealed storage cavity. This would be especially advantageous since the posterior mold could also serve as a long term and extremely compact contact lens case after the plastic/foil seal has been broken and removed.

Many other modifications and variations of the present invention are possible to one skilled in the field in light of the teachings herein. It is therefore understood that, within the scope of the claims, the present invention can be practiced other than as herein specifically described.

We claim:

1. In a contact lens package comprising a mold half having a concave lens molding surface, the improvement which comprises having a lens storage cavity separate from the lens molding surface, a storage solution, a contact lens, and a cover, the storage cavity bounded by a convex surface opposite the lens molding surface, a substantially cylindrical wall and said cover.

2. The contact lens package of claim 1 wherein the cover is made from a laminate of plastic and metal foil.

3. In a contact lens package comprising a mold half having a convex lens molding surface, the improvement which comprises having a lens storage cavity separate from the lens molding surface, a storage solution, a contact lens, and a cover, the storage cavity bounded by a concave surface opposite the lens molding surface, a substantially cylindrical wall and said cover.

4. The contact lens package of claim 3 wherein the mold is made from polypropylene.

5. The contact lens package of claim 3 wherein the cover is made from a laminate of plastic and metal foil.

6. The contact lens package of claim 3 wherein a threaded region is located at the top of the storage cavity and receives a cover dimensioned to fit the threaded region.

7. The contact lens package of claim 3 wherein the mold is used to mold and package hydrophilic contact lenses.

* * * * *